Dec. 20, 1949
M. ABRAHAMS ET AL
2,491,944
COMBINATION SOUND AND VISUAL
REPRODUCTION APPARATUS
Filed Dec. 19, 1946
2 Sheets-Sheet 1
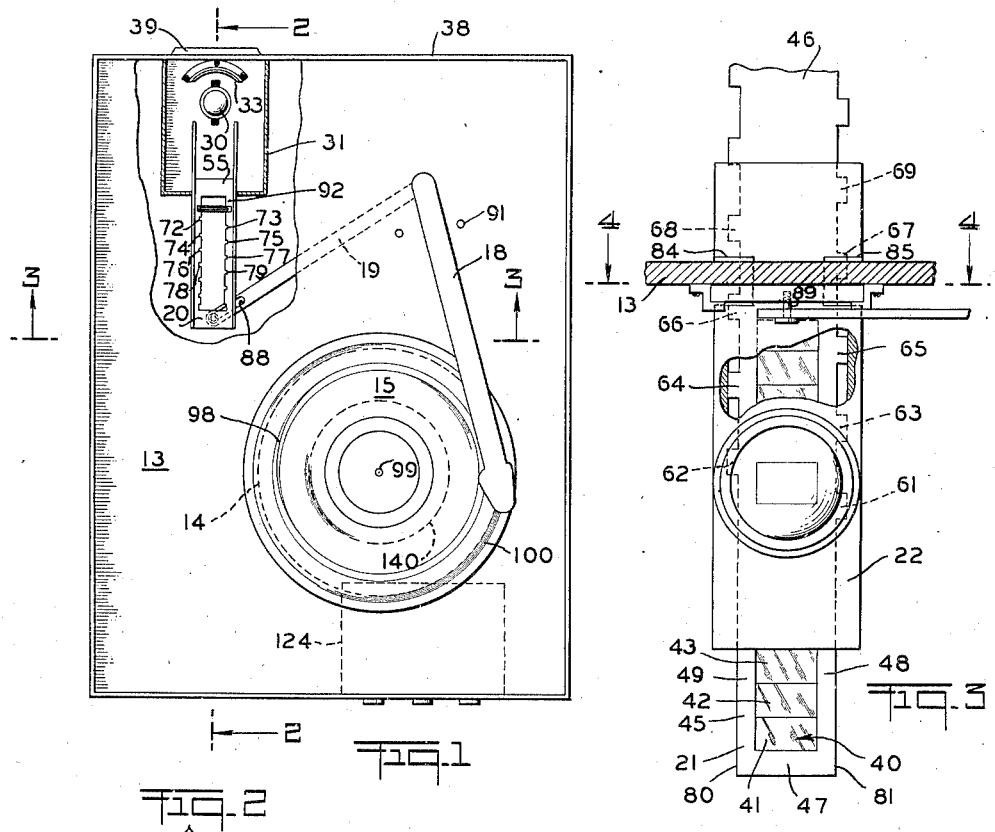
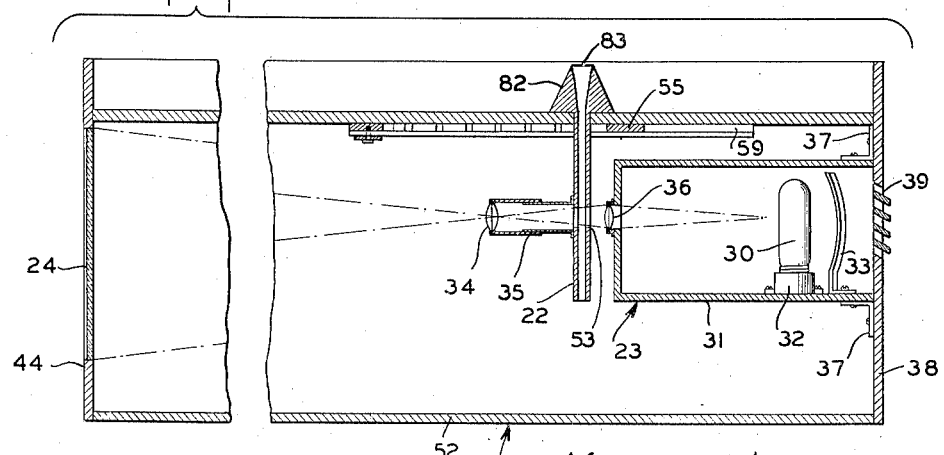
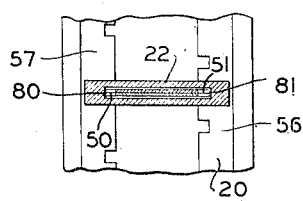
Mortimer Abrahams
George Gould
INVENTORS
BY Richard S. Jenks
ATTORNEY

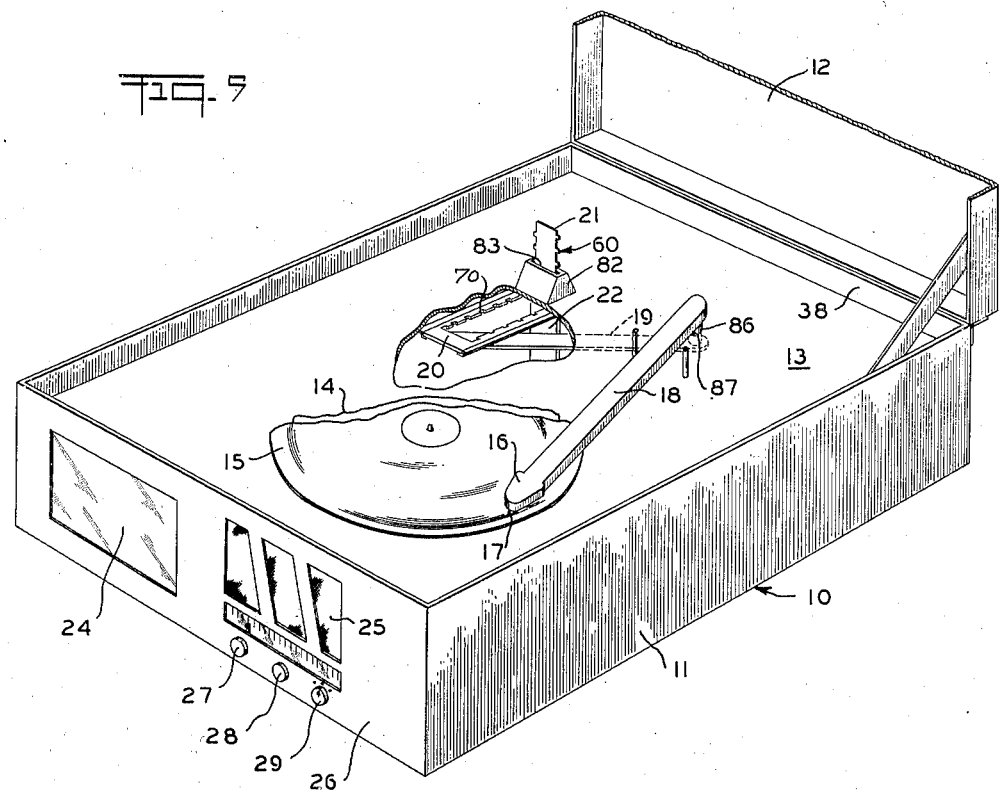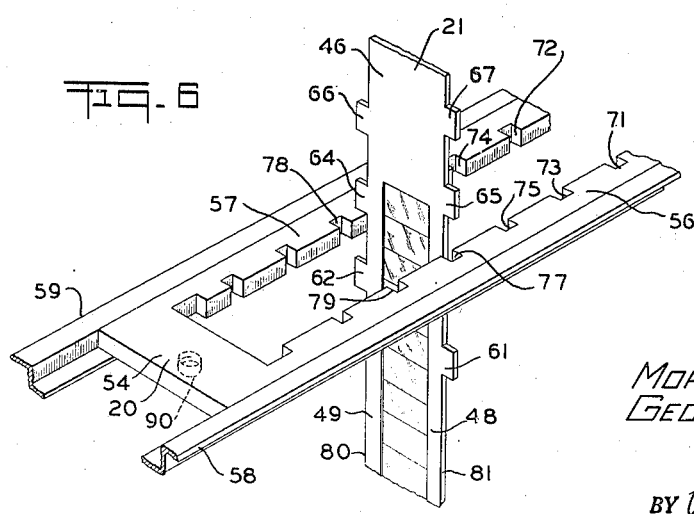

Patented Dec. 20, 1949

2,491,944

UNITED STATES PATENT OFFICE 2,491,944

COMBINATION SOUND AND VISUAL REPRODUCTION APPARATUS

Mortimer Abrahams and George Gould, Brooklyn, N. Y.

Application December 19, 1946, Serial No. 717,114

3 Claims. (Cl. 88—28)

This invention relates generally to sound producing devices having means for the synchronous projecting of pictures, and more particularly to such apparatus in which not only is the sight and sound properly correlated, but which is of simplified construction, with a self contained screen.

For various entertainment and educational purposes, an apparatus which may be used for projecting pictures and simultaneously therewith presenting audible material which is correlated with the subject matter of the projected pictures, is a highly desirable and useful mechanism. While the prior art shows attempts in this direction, such devices have been open to a number of objections, including: high first cost; complex mechanisms which tend to go out of adjustment and thereby lose synchronism; the use of delicate parts requiring nice adjustments and frequent servicing; and large size.

It is therefore among the objects of the present invention to provide combination sound and visual reproduction apparatus which substantially avoids the foregoing disadvantages of prior art constructions.

Another object herein lies in the provision of an instrument of the class described which is compact and simple so that the same may be manufactured in large quantities at low cost. This permits the use of our invention for educational and entertainment purposes for children where a sturdy low cost instrument is a necessity.

Another object herein lies in the provision of an instrument wherein a fine degree of synchronization may be obtained since the shifting of the pictures for projection is accomplished by a control which is regulated by the grooves in the sound recording.

A feature of the invention lies in the fact that by virtue of the simplicity of the mechanism for controlling the projection, it may be installed in relatively standard sound reproducing devices with only slight changes being required.

Another feature of the invention lies in its convenience of operation; no adjustments being required when the recording and slide carrier are changed. This enables its operation by children having relatively low skill.

A feature of the invention lies in the fact that the apparatus may include not only recorded programs accompanied by picture slides, but the same instrument may be used for radio purposes. The present instrument may be used in conjunction with standard recordings without modification or adjustment. No setting, resetting or presetting is required.

These objects and other incidental ends and advantages will more fully appear in the progress of this disclosure and be pointed out in the appended claims.

In the drawings in which similar reference characters designate corresponding parts throughout the several views:

Fig. 1 is a plan view partly broken away and with the cover of the cabinet removed showing an embodiment of the invention.

Fig. 2 is an enlarged fragmentary vertical sectional view as seen from the plane 2—2 on Fig. 1 with the carrier removed.

Fig. 3 is an enlarged fragmentary detail sectional view as seen from the plane 3—3 on Fig. 1.

Fig. 4 is an enlarged fragmentary horizontal sectional view as seen from the plane 4—4 on Fig. 3.

Fig. 5 is a fragmentary view in perspective of the instrument shown in Fig. 1, with the hinged cover added.

Fig. 6 is a fragmentary perspective view of a portion of the film carrier feed.

In accordance with the invention, the apparatus generally indicated by reference character 10 comprises broadly: a cabinet 11, a cover 12, a base plate 13, a turntable 14, a record 15, a pickup 16 having a stylus 17, a tone arm 18, a crank 19, a feeding plate 20, a picture carrier 21, a carrier guide chute 22, a projector 23, a viewing screen 24 and an electronic amplifier and radio receiver 124.

The amplifier and receiver 124 may be of any suitable type having a speaker mounted behind the grill 25 in the front wall 26 of the device 10. The amplifier and receiver 124 may be controlled by an on and off switch and volume control 27, a tuning control 28. A switch 29 may have a plurality of positions, one in which the radio alone functions, another in which the pickup 16 is connected to the amplifier alone, and a third position in which the projector lamp 30, the amplifier and the pickup is energized. It will be understood of course that the pick-up is electrically connected to the amplifier and the lamp 30 is connected to the switch 29 and a source of energy in a well known manner, such connections not being illustrated in the drawings for purposes of clarity.

The turntable 14 may be powered by a suitable electric motor 140 which is connected into the circuit when the switch 29 is in its central or right hand position as viewed in Fig. 5. The motor being conventional, the same is not illustrated in the drawings in detail.

The projector 23 may include a casing 31, a mounting 32 for the lamp 30, a condenser system 33 and 36 and a lens 34. The lens 34 may be of any suitable type which may be rigidly secured in the structure 35 to assure permanent focus of an image of a transparency 40 disposed within the chute 22, upon the self contained screen 24. The projector casing 31 may be supported in any suitable manner, as for example by brackets 37 attached to the rear wall 38 of the cabinet 11. Ventilating means 39 may be provided for the escape of heat from the lamp 30 to the ambient air.

The viewing screen 24 may be ground glass or similar material mounted within an orifice 44 in the front wall 26 so that the image cast upon it from the rear may be viewed by a person in front of the device 10.

The picture carrier 21 includes: a frame 45 having a top frame portion 46, a bottom frame portion 47 and side frame portions 48 and 49. The frame 45 may be composed of any suitable material, as for example heavy cardboard, sheet plastic, or metal. The frame 45 may be composed of a pair of laminations 50 and 51 (see Fig. 4) between which a plurality of transparencies generally indicated by reference character 40 may be mounted. The number of transparencies will depend upon their size and the related parts. By way of example, we have shown twelve transparencies and corresponding projections and notches to accommodate the same. The side frame portions 48 and 49 are provided with a plurality of outwardly extending and oppositely staggered projections generally indicated by reference character 60 which coact with a series of staggered indentations or notches in the feeding plate 20 and generally indicated by reference character 70. Obviously, the carrier 21 may be varied in length, but it should not be of excess length so that the bottom frame portion 47 would strike against the upper surface of the bottom wall 52 of the cabinet 11 before the last or uppermost transparency 40 would reach a position in the gate 53 in the chute 22. As seen in Fig. 3, some of the projections 60 are indicated by the consecutive reference characters 61–69 inclusive, and similarly as seen in Fig. 1 or Fig. 6 by reference characters 71–79 inclusive, the notches are indicated.

The feeding plate 20 includes: a front transverse portion 54, a rear transverse portion 55 and side portions 56 and 57. The plate 20 as a unit is adapted for forward and rearward reciprocal movement by being slideably mounted within the channel guides 58 and 59 which are secured to the under surface of the base plate 13 in any suitable manner. The transverse distance between the portions 56 and 57 of the feeding plate 20 is substantially equal to or slightly greater than the distance between the longitudinal edges 80 and 81 of the carrier 21. The carrier guide chute 22 is provided with an enlarged head 82 having a mouth 83. The head mounts the guide 22.

The guide 22 has a pair of opposed indentations 84 and 85 so that the side portions 56 and 57 may slide therethrough. If desired, the chute 22 may be made so as to be separate from the head 82 for this purpose. The inside dimensions of the chute 22 are preferably substantially equal to or slightly greater than the cross sectional dimensions of the carrier 21 including the projections 60 on both sides. The gate 53 is formed by a pair of opposed orifices in the chute opposite the lens 34 and the condenser 36.

The tone arm 18 has a downwardly projecting axle 86 at the rear end thereof, said axle being journaled suitably within an orifice 87 in the base plate 13. Affixed to the lower end of the axle 87, below the base plate 13, is the crank 19. The outer end of the crank 19 is provided with an elongated slot 88 which is penetrated by a pivot pin 89. The pin 89 is mounted by threadedly engaging a hole 90 in the portion 54 of the feed plate 20. By virtue of the construction just described, arcuate movement of the tone arm 18 in a clockwise direction as viewed in Fig. 1 will result in a rearward movement of the feeding plate 20.

*Operation*

Assuming that the apparatus is set for the simultaneous reproduction of sound through the grill 25 and for the projection of pictures upon the screen 24, a disc record 15 is placed upon the turntable 14 and the tone arm 18 is placed on the first groove of the recording. This operation automatically brings the feeding plate into starting position. In this position the portion 92 (Fig. 1) lies within the indentations 84 and 85 of the chute 22. The carrier 21 is now inserted downwardly through the mouth 83 until the projection 61 rests upon the portion 92. This placed the first transparency 41 in the gate 53 to be projected upon the screen 24. The particular record 15 and the particular carrier 21 are of course correlated so that the pictures in the carrier correspond to different portions of the sound track or groove in the recording. After the stylus 17 is engaged with the groove 100 in a well known manner, the tone arm 18 is moved toward the axis of rotation of the record. This results in a translation of the arcuate movement of the pickup arm to a straight line motion of the feeding plate 20. After a predetermined amount of movement, the first notch 71 lines up with the projection 61 and the carrier drops down under the action of gravity until the next projection 62 engages upon the portion 57 of the feeding plate 20 which is located rearwardly of the notch 72. This supports the carrier so that the picture 42 lies within the gate 53 to be projected upon the screen 24. This step by step downward travel of the carrier is continued as the tone arm 18 continues its inward travel in a clockwise direction as viewed in Fig. 1.

As shown in the drawings, the projections 60 and the notches 70 are equidistantly spaced. This arrangement is satisfactory where the portions of the recording are substantially equal and are keyed or synchronized at the time of recording with the movement of the slide. On a disc recording where the groove speed is slower as the axis of rotation 99 is approached, the recording period for a given shift of scene will be shorter. Where desired, this may be compensated for by changing the standard spacing of the notches in the feeding plate 20 so that they are more widely spaced in a gradual manner as the portion 54 is approached. Uniform spacing of the notches and projections may be utilized however and synchronism may be obtained by rapidly increasing the screw pitch of the groove in the recording. This is indicated by reference character 98. When the recording has been finished and all of the pictures shown, the slide 21 may be removed and the mechanism is free for the next insertion.

It may thus be seen that we have provided a novel and useful construction of apparatus for the purpose intended and which is compact, simple, foolproof in operation and which may be manufactured in large quantities at low cost.

We wish it to be understood that we do not desire to be limited to the exact details of construction shown and described, for obvious modifications will occur to a person skilled in the art.

We claim:

1. An apparatus of the class described comprising: a slide carrier containing a plurality of transparencies, said carrier having a plurality of projections extending outwardly from opposed portions thereof in a staggered arrangement; a feeding plate having an elongated opening through which the slide carrier may depend, said feeding plate having opposed side portions having notches arranged in staggered relation; said elongated opening in the feeding plate being of a width sufficient to support the slide carrier by one of the projections resting upon one of the side portions of the feeding plate; and means to longitudinally shift said feeding plate, said means including a tone arm having a pivotal mounting and a crank radially extending from said mounting, said crank at the outer end thereof being slideably and pivotally connected to said feeding plate.

2. A transparency projecting device for use with a sound reproducing mechanism having a movable tone arm, comprising: a slide carrier having a plurality of spaced projections; a feeding plate having a plurality of spaced indentations; said slide carrier and said feeding plate being arranged with said projections engaging said feeding plate at portions located between said indentations; and means to move said feeding plate including a member interconnecting the tone arm and the feeding plate.

3. A transparency projecting device for use with a sound reproducing mechanism having an arcuate movable tone arm, comprising: a slide carrier having a plurality of spaced projections; a feeding plate having a plurality of spaced indentations; said slide carrier and said feeding plate being arranged with said projections engaging said feeding plate at portions located between said indentations; and means to move said feeding plate including a lever interconnecting the tone arm and the feeding plate.

MORTIMER ABRAHAMS.
GEORGE GOULD.

REFERENCES CITED

The following references are of record in the file of this patent:

FOREIGN PATENTS

| Number | Country | Date |
| --- | --- | --- |
| 996,102 | Matthews | June 27, 1911 |
| 1,482,387 | Donaldson | Feb. 5, 1924 |
| 1,584,708 | Billing | May 11, 1926 |
| 2,038,976 | Wood et al. | Apr. 28, 1936 |
| 2,066,538 | Phelps | Jan. 5, 1937 |
| 2,088,516 | Grier | July 27, 1937 |